United States Patent
Gopalakrishnan (10) Patent No.: US 7,853,582 B2
(45) Date of Patent: Dec. 14, 2010

(54) METHOD AND SYSTEM FOR PROVIDING INFORMATION SERVICES RELATED TO MULTIMODAL INPUTS

(76) Inventor: Kumar C. Gopalakrishnan, 651 Franklin St., #4208, Mountain View, CA (US) 94041

(*) Notice: Subject to any disclaimer, the term of this patent is extended or adjusted under 35 U.S.C. 154(b) by 142 days.

(21) Appl. No.: 11/423,244

(22) Filed: Jun. 9, 2006

(65) Prior Publication Data

US 2006/0218192 A1    Sep. 28, 2006

Related U.S. Application Data

(63) Continuation-in-part of application No. 11/215,601, filed on Aug. 30, 2005.

(60) Provisional application No. 60/689,345, filed on Jun. 10, 2005, provisional application No. 60/689,613, filed on Jun. 10, 2005, provisional application No. 60/689,618, filed on Jun. 10, 2005, provisional application No. 60/689,741, filed on Jun. 10, 2005, provisional application No. 60/689,743, filed on Jun. 10, 2005, provisional application No. 60/606,282, filed on Aug. 31, 2004.

(51) Int. Cl.
*G06F 17/30* (2006.01)
*G06F 15/16* (2006.01)

(52) U.S. Cl. ............... 707/708; 704/231; 704/251; 704/260; 379/88.13

(58) Field of Classification Search ........... 707/104.1, 707/2, 3, 4, 706, 707, 708; 1/1; 704/231, 704/251, 260; 379/88.13
See application file for complete search history.

(56) References Cited

U.S. PATENT DOCUMENTS

| | | | |
|---|---|---|---|
| 6,507,838 B1* | 1/2003 | Syeda-Mahmood | 707/3 |
| 6,522,889 B1 | 2/2003 | Aarnio | |
| 7,269,623 B2* | 9/2007 | Neely et al. | 709/205 |
| 7,340,214 B1 | 3/2008 | Hamberg | |
| 2001/0024949 A1* | 9/2001 | Yanagida et al. | 455/404 |
| 2001/0049603 A1* | 12/2001 | Sravanapudi et al. | 704/270.1 |
| 2002/0054083 A1* | 5/2002 | Boreczky et al. | 345/738 |
| 2002/0102966 A1 | 8/2002 | Lev et al. | |
| 2002/0184196 A1* | 12/2002 | Lehmeier et al. | 707/3 |
| 2002/0184203 A1 | 12/2002 | Nastar et al. | |
| 2002/0198789 A1* | 12/2002 | Waldman | 705/26 |
| 2003/0014286 A1* | 1/2003 | Cappellini | 705/5 |
| 2003/0069877 A1* | 4/2003 | Grefenstette et al. | 707/2 |
| 2004/0015562 A1* | 1/2004 | Harper et al. | 709/217 |
| 2004/0031058 A1* | 2/2004 | Reisman | 725/112 |
| 2004/0078216 A1* | 4/2004 | Toto | 705/2 |
| 2004/0111410 A1* | 6/2004 | Burgoon et al. | 707/4 |
| 2005/0011957 A1* | 1/2005 | Attia et al. | 235/462.46 |

(Continued)

OTHER PUBLICATIONS

Ed Kaiser, Alex Olwal, David McGee, Hrvoje Benko, Andrea Corradini, Xiaoguang Li, Phil Cohen, Steven Feiner; Mutual Disambiguation of 3D Multimodal Interaction in Augmented and Virtual Reality; ACM, ICMI'03; Nov. 2003.*

(Continued)

*Primary Examiner*—Greta L Robinson
*Assistant Examiner*—Dennis Truong (57) ABSTRACT

A system and method provides information services related to multimodal inputs. Several different types of data used as multimodal inputs are described. Also described are various methods involving the generation of contexts using multimodal inputs, synthesizing context-information service mappings and identifying and providing information services.

20 Claims, 6 Drawing Sheets

U.S. PATENT DOCUMENTS

| | | |
|---|---|---|
| 2005/0038688 A1* | 2/2005 | Collins et al. ................... 705/9 |
| 2005/0049008 A1* | 3/2005 | Muto ......................... 455/566 |
| 2005/0084140 A1* | 4/2005 | Kakadiaris et al. .......... 382/118 |
| 2005/0136955 A1* | 6/2005 | Mumick et al. ............. 455/466 |
| 2005/0162523 A1* | 7/2005 | Darrell et al. ............ 348/211.2 |
| 2005/0261990 A1* | 11/2005 | Gocht et al. ................... 705/27 |
| 2006/0002607 A1* | 1/2006 | Boncyk et al. .............. 382/165 |
| 2006/0012677 A1 | 1/2006 | Neven et al. |
| 2006/0026140 A1* | 2/2006 | King et al. ..................... 707/3 |
| 2006/0047704 A1* | 3/2006 | Gopalakrishnan ........ 707/104.1 |

OTHER PUBLICATIONS

Christian Elting, Stefan Rapp, Gregor Möhler, Michael Strube; Architecture and Implementation of Multimodal Plug and Play; ACM, ICMI'03; Nov. 2003.*

* cited by examiner

| Context | Constituents | | | | |
|---|---|---|---|---|---|
| Context 1 | Primary Data 1 | Implicit Data 1 | Metadata 1 | | |
| Context 2 | Primary Data 1 | Primary Data 2 | Implicit Data 1 | Metadata 1 | Metadata 2 |
| Context 3 | Primary Data 1 | Primary Data 2 | Implicit Data 1 | Metadata 1 | Metadata 2 | Metadata 3 |
| Context 4 | Image 1 | "Text abc" | 5/1/5 | UserGroup1 | | |

Fig. 3

| Context | Information Service | Type | Pricing |
|---|---|---|---|
| Context 1 | Information Service 1 | Free | N/A |
| Context 1 | Information Service 2 | Commercial | $ 1.00 |
| Context 2 | Information Service 3 | Sponsored | $ 0.25 |

METHOD AND SYSTEM FOR PROVIDING INFORMATION SERVICES RELATED TO MULTIMODAL INPUTS

CROSS-REFERENCE TO RELATED APPLICATIONS

This application claims the benefit of U.S. provisional patent application 60/689,345, 60/689,613, 60/689,618, 60/689,741, and 60/689,743, all filed Jun. 10, 2005, and is a continuation in part of U.S. patent application Ser. No. 11/215,601, filed Aug. 30, 2005, which claims the benefit of U.S. provisional patent application 60/606,282, filed Aug. 31, 2004. These applications are incorporated by reference along with any references cited in this application.

BACKGROUND OF THE INVENTION

The present invention is related to multimedia information systems and multimedia communication. More specifically, the invention is related to providing information services related to multimodal inputs.

Computer systems today predominantly rely on textual queries for retrieving information. Systems for automatic retrieval and providing of information services related to multimodal inputs do not exist. More specifically, computer systems for providing information services related to visual imagery and other multimodal inputs are in need.

BRIEF SUMMARY OF THE INVENTION

The present invention enables a user to retrieve information services related to multimodal inputs. The information services are identified and provided based on multimodal contexts. The multimodal contexts are generated from the multimodal inputs such as multimedia content, associated metadata, user inputs, and knowledge sourced from knowledgebases. Information services are mapped to the contexts manually by the users of the system or programmatically by the system.

Other objects, features, and advantages of the present invention will become apparent upon consideration of the following detailed description and the accompanying drawings, in which like reference designations represent like features throughout the figures.

DETAILED DESCRIPTION OF THE INVENTION

A system and methods are described for generating contexts from multimodal inputs, providing information services relevant to the multimodal inputs and synthesizing mappings between multimodal contexts and information services. The specific embodiments described in this document represent exemplary instances of the present invention, and are illustrative in nature rather than restrictive.

Various embodiments present a mechanism for generating contexts from a plurality of multimodal information sources through appropriate processing of each type of multimodal information. Embodiments also provide a means for storing of the contexts into a database and retrieving the contexts from the database using queries composed of multimodal information. Embodiments also provide a means for retrieving information services related to contexts and hence, to the multimodal information from which the contexts were generated. A method for associating one or more information services to a context is also described.

In the following description, for purposes of explanation, numerous specific details are set forth in order to provide a thorough understanding of the invention. It will be apparent, however, to one skilled in the art that the invention can be practiced without these specific details. In other instances, structures and devices are shown in block diagram form in order to avoid obscuring the invention.

Reference in the specification to "one embodiment" or "an embodiment" or "some embodiments" means that a particular feature, structure, or characteristic described in connection with the embodiment is included in at least one embodiment of the invention. The appearances of the phrase "in one embodiment" or "some embodiments" in various places in the specification are not necessarily all referring to the same embodiment, nor are separate or alternative embodiments mutually exclusive of other embodiments. Features and aspects of various embodiments may be integrated into other embodiments, and embodiments illustrated in this document may be implemented without all of the features or aspects illustrated or described.

Various embodiments are implemented in a computer system as either software, hardware, firmware or a combination thereof. Also, an embodiment is implemented either in a single monolithic computer system or over a distributed system of computers interconnected by a communication network. While the description below presents the full functionality of the invention, the mechanisms presented in the invention are configurable to the capabilities of the computer system on which it is implemented, the resources available in the computer system on which it is implemented and the requirements for the intended use of the contexts generated from multimodal information.

Various methods described in this description are implemented as software modules that execute on the system server on server hardware in a datacenter. Besides processing engines for executing software modules, the system server also includes storage in the form of a local hard disks or a storage area network.

In some embodiments, the system server is accessed by users from a client resident on a camera equipped client device such as a camera phone. The user uses the client to access information services relevant to the multimodal inputs captured using the camera phone. The client resident on a camera phone communicates with the system server over a wireless communication channel and presents the information services generated by the methods presented, which are executed on the system server.

The term "system" is used to refer to a system for providing information services related to multimodal inputs. The term "multimodal information" or "multimodal inputs" is used to refer to information that may be composed of a plurality of media or data types such as audio, video, graphics, temperature, pressure and other sensor measurements. The term "information service" is used to refer to a user experience provided by the system that may include (1) the logic to present the user experience, (2) multimedia content, and (3) related user interfaces. The term "content" is used to refer to multimedia data used in the information services. "Databases" are defined as collections of data while "knowledgebases" are defined as collections of data in conjunction with information that provide syntactical and semantic structure to the data in the collection and logic for interpreting the data in the collection and its structure. For instance, a collection of words in the English language is classified as a database while a collection of words in the English language and their usage syntax and semantics, i.e., the rules of English language grammar, together would form a knowledgebase. In some embodiments, knowledgebases may be implemented as databases such that there is no distinction between them. The term "operator" refers to an individual or business entity that operates a system as described below.

Multimodal inputs are used to generate multimodal contexts. Multimodal contexts are nonempty sets of one or more primary data, metadata, and implicit data. These data types described in further detail below. Contexts may also have associated metadata such as location of availability, time of availability, position in classifications of contexts, quantitative and qualitative metrics describing their value, and the like. The multimodal contexts may have a plurality of information services associated with them. The multimodal contexts enable the storage, retrieval, and management of the associated information services. The information services may be, in their simplest form, multimedia information or in a more complex form, a multimedia user experience integrating user interfaces, multimedia information, and the logic that orchestrates the interplay between the user interface and the multimedia information.

The multimodal information used as input by the system may be sourced in real time, as it is generated, as in the case of video camera feeds or weather telemetry. The multimodal input information may also be sourced from storage infrastructure such as multimedia databases or domain specific multimedia knowledge bases. The databases and knowledge bases used by the invention may be internal to the system or external to the system, as in the case of the World Wide Web or the user's personal computer.

The multimodal information used as input by the system is classified into "primary data," which is defined as data that can potentially stand alone as a quantum of information and "metadata," which is defined as data that qualifies the primary data. In addition to the multimodal input information, the system also uses "implicit data," which is defined as data derived through analysis of the multimodal input information.

Primary data refers to information in audio, visual, textual, or graphical formats, which communicate information on their own. Primary data may be generated in conjunction with each other or independent of each other. Examples of Primary data include visual imagery, speech audio data, computer graphics, textual information, textual user input, users' usage of the system, classifications of the knowledge in the system, membership data for various user groups using the system, profiles of users of the system, explicitly specified preferences of the users of the system, explicitly specified features and capabilities of devices used to access the system, explicitly specified characteristics of the environment and other information from knowledge bases containing specialized knowledge on various domains.

Primary data used by the system may include one or more of each of the data types listed below.

One type of primary data is text. Alphanumeric text such as characters, symbols, words, phrases, sentences and their formatting information are used as primary data. Such text may be entered into the system by the users or operators of an embodiment. Formatting information includes physical characteristics of the text such as its font, size, color, style, emphasis, and physical characteristics of the text's background such as its color, texture, and the like.

One type of primary data is visual data. Visual data may be in the form of a 2D pixel raster such as a still image or have an additional temporal dimension as in the case of video sequences. Visual data may be generated by capturing real world scenes using a visual sensor such as a CCD. Visual data may be stored in uncompressed pixel rasters or in compressed formats such as JPEG, GIF, MPEG, Windows Media, 3GPP or other proprietary formats.

One type of primary data is audio data. Audio data includes speech, music and other data sequences used to capture and communicate audio information. The audio information may be captured from the real world using a sensor such as microphone or synthesized using a computer. The audio data may be stored as uncompressed PCM data or in compressed formats such as WAV, MP3, MPEG Audio, Windows Media Audio, AMR, PureVoice, or other proprietary formats.

One type of primary data is graphical data. Graphical data is visual information synthesized using a computer. It includes still graphics rendered as a single raster or sequences of graphics rasters rendered as an animation. The graphical data may be encoded as uncompressed rasters or in compressed formats such as BMP, JPEG, GIF, MPEG, Windows Media, or 3GPP or other vector and proprietary formats.

One type of primary data is user input. Certain components of user behavior such as interactions on a user interface may be explicitly captured by the system. User interface data that may be captured include key presses, key press duration, key press frequency, joystick inputs, and interactions on a touch sensitive screen.

One type of primary data is users' history of usage of the system. The history of users' usage of the system may be stored as the users use the system. This usage history may be used to infer usage pattern knowledge such as frequency of usage of the system by a specific user.

One type of primary data is user groups. A database of user groups in the system is generated by storing the user groups created explicitly by users or automatically by the system through analysis of explicitly specified preferences of the users and users' usage of the system.

One type of primary data is explicitly specified system parameters. Explicitly specified parameters of the system include preferences of users of the system, characteristics of users' environments, features and capabilities of the software and hardware components of the system, and characteristics of the communication channel connecting the components. Such primary data may be stored in knowledge bases that capture such data along with the domain specific knowledge associated with each of such set of data.

One type of primary data is domain specific knowledge. Various knowledge bases containing specialized domain specific knowledge such as logos, the grammar, syntax, and semantics of languages, geographic information, or parameters to setup a communication service such as email or SMS may also be used by the system.

Metadata refers to information that qualifies the primary data and may not bear significant value on its own, i.e., metadata is data about primary data. Examples include the time and location of capture of the primary data, the time and location of the last modification of the primary data, the temperature and atmospheric pressure at the location of capture of the primary data, the authors of the primary data, contributors to the primary data such as scripts writers, directors, musicians and actors, the location and the time of accessing the primary data, the commercial or sponsored nature of the primary data and knowledge derived from it, the value of financial transactions associated with commercial or sponsored primary data, the access rights for users of the system to the primary data and knowledge derived from it, user access privileges for the knowledge in the system, explicitly specified popularity of the knowledge available in the system and explicitly specified popularity of the authors contributing knowledge to the system.

Metadata used by the system may include zero or more of each of the data types listed below.

One type of metadata is location. Location is a sample of a spatial coordinate. The location may be defined in spatial coordinate systems such as a latitude-longitude pair, geographical address or a cellular network map coordinates.

One type of metadata is motion. The motion of an object in the real world might be quantified in absolute coordinates or in relation to a location metadata. Motion may be parameterized with a location pair and the time to move between the location pair or a location, timestamp and a velocity or a location, timestamp, velocity and acceleration or with equivalent parameters expressed in terms of appropriate sensor parameters.

One type of metadata is time. Time may be expressed in universal time coordinates or an equivalent representation. The time coordinate captures the instant at which a particular real world event happened such as creation or modification of a primary data.

One type of metadata is user access privileges. User access privileges specify the rights of users of the system to access various features of the system. These privileges may be set by users of the system for contexts and information services in the system for which they have the rights such as in the case of contexts and information services authored by them. In addition, the system may also set the access privileges for various users of the system as determined by various criteria such as the users' language, age, etc.

One type of metadata is financial transactions. Contexts in the system and the associated information services may have financial transactions associated with them that define the commercial or sponsored nature of the contexts and the associated pricing model for the financial transactions.

One type of metadata is an environmental factor. Environmental factors such as temperature, humidity, and atmospheric pressure or other real world data that may be parameterized using standard techniques to generate metadata on the environment.

One type of metadata is instrument parameter. The parameters of instruments used to capture real-world data for the above primary data and metadata may be explicitly known and may constitute important metadata. Such metadata includes precision of the sensors, size, and position of sensors and the speed with which the sensors measure the real world data.

Implicit data refers to information that is embedded in the multimodal input information. Examples of implicit data extracted from audio primary data include the textual representation of speech embedded in the audio data, identifying information for the speaker whose speech is embedded in the audio data, the intonation and mood of the speaker whose speech is embedded in the audio data, musical notes representing the music embedded in the audio data and identifying information for music embedded in the audio data.

Examples of implicit data extracted from visual primary data such as still images or video include the textual representation of any text embedded in the visual data, the formatting information for any text embedded in the visual data such as the color, font, style, emphasis and layout of the text, identifying information for any logos or symbols embedded in the visual data, graphical marks that are embedded in the visual data, identifying information for other objects present in the visual data such as people, buildings, etc. and characteristics of the visual imagery such as color histogram, brightness and contrast.

In addition, any audio data that accompanies the video data might be used to extract implicit data as described earlier. Other examples of implicit data include learned popularity of the contexts and information services available in the system, learned popularity of the authors contributing contexts and information services to the system, learned features and capabilities of devices used to access the system, learned preferences of the users of the system and learned characteristics of the environment. The system may learn implicit data through automatic computer analysis or through human aided computer analysis of users' usage of the system.

Implicit data is derived through analysis of the multimodal input information using appropriate tools for analysis and recognition. The implicit data used in the system may include zero or more of the data types listed below.

One type of implicit data is visually formatted text. Visually formatted text consists of the literal textual information, its formatting and layout. Literal textual information consists of sequences of alphabets, numerals, and punctuation marks and the like. Formatting information includes physical characteristics of the text such as its font, size, color, style, emphasis, and physical characteristics of the text's background such as its color, texture, and the like. Literal textual information is extracted from visual content such as still images and video using an optical character recognition engine or other type of text recognition engine. Text recognition engines may also extract formatting and layout information of the embedded text.

One type of implicit data is logos. Logos are unique visual marquees used for branding. Logos are characterized by their unique physical design characteristics such as the pattern or texture, color and constituent visual primitive elements such as a circle or a line.

One type of implicit data is symbols. Symbols are unique visual marquees similar to logos except that unlike logos they are not used to communicate commercial information. Symbols usually have characteristic features that are used to identify their presence. Once the presence of a symbol is identified in a visual content, the symbol is decoded using the standard decoding technique defined for that symbolic code.

One type of implicit data is visual layout. The layout of visual elements such as, textual elements such as characters, words, lines, regions; geometrical elements such as lines and arcs and pictographic information such as logos and symbols in visual content such as a still image or video may be parameterized by the position, size and orientation of the visual elements in absolute metrics, with respect to each other and with respect to the boundaries of the visual content. The background color and pattern or texture of various foreground and background regions in the visual content may also be part of visual layout information. Text recognition engines along with other recognition engines designed to extract visual cues and pictorial information, may be used to extract the visual layout information.

One type of implicit data is spoken text. Speech is an audio representation of text and consists of the literal textual information and audio formatting information such as intonation. Speech audio content may be converted to textual information using a speech recognition engine. Text extracted from speech may contain cues relating to temporal formatting and layout, and intonations that hint the punctuation marks used to represent them visually.

One type of implicit data is musical elements. Musical elements such as known sounds, rhythms and beats may be extracted from nonspoken audio content. Nonspoken audio content is treated as music in general and analyzed for musical elements such as known sounds and rhythms using music recognition engines.

One type of implicit data is audio layout. Audio layout consists of the position, duration, and pitch of audio elements in an audio track. Audio layout information such as the position, duration, and pitch of elements of an audio track are extracted with an audio recognition engine.

One type of implicit data is user behavior. Certain user behavior characteristics are derived from the history of user behavior collected over time. Examples of such implicit data include user's topics of interest and user's system usage patterns.

One type of implicit data is environmental data. The environment from which a user accesses the system may affect the user's access of the system. Examples of such factors include the characteristics of the instrument used to access the system by the user, the noise level in captured audio and the nature of the lighting in captured visual content.

Besides the implicit data presented earlier, which were generated from single input information types, advanced implicit data may be extracted through analysis of a plurality of the multimodal information and implicit data types described earlier.

Figure 1:
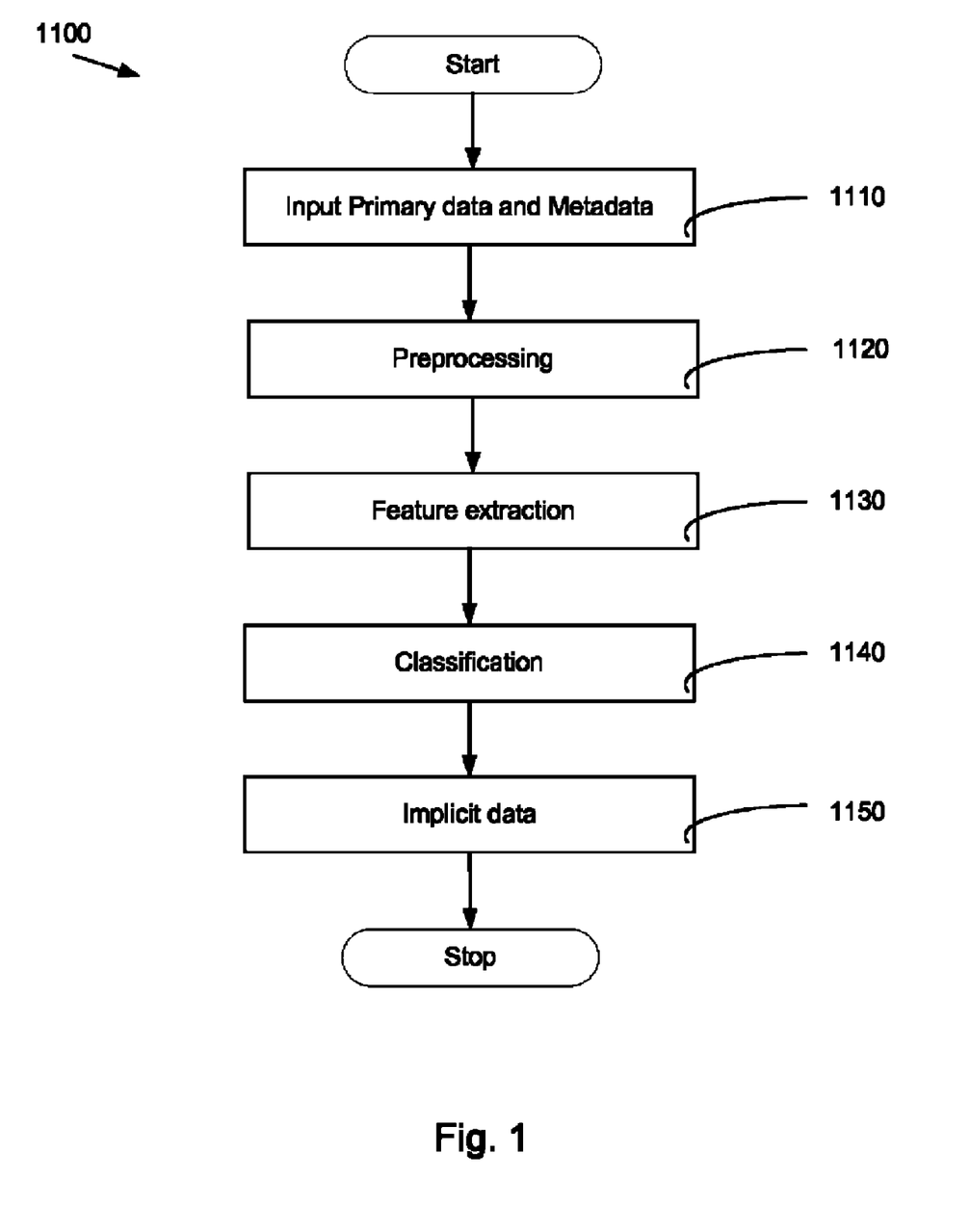
FIG. 1 illustrates an exemplary process for generating implicit data from primary data, in accordance with an embodiment.

The analysis of the multimodal input information to extract implicit data through automated computer analysis or through computer analysis in conjunction with human supervision is performed by recognition engines. FIG. 1 illustrates an exemplary implicit data generation method 1100. Process 1100 and other processes of this document are implemented as a set of modules, which may be process modules or operations, software modules with associated functions or effects, hardware modules designed to fulfill the process operations, or some combination of the various types of modules. The modules of process 1100 and other processes described herein may be rearranged, such as in a parallel or serial fashion, and may be reordered, combined, or subdivided in various embodiments.

In one embodiment, the implicit data generation process is comprised of three steps: 1) preprocessing 1120, 2) feature extraction 1130 and 3) classification 1140. Each type of multimodal input information such as video or audio and their combinations thereof, require preprocessing, feature extraction and classification of the extracted features to recognize the specific type of embedded implicit data being recognized.

The preprocessing operations 1120 used for the multimodal input information depends on the media type of the input information, the equipment used to capture the input data and the implicit data that needs to be extracted. For example, in the case of visual input information, preprocessing may involve image enhancement techniques like blur correction, contrast improvement, noise reduction, and brightness adjustment.

Feature extraction 1130 depends on the type of implicit data being extracted and media type of the data. Features extracted may comprise of one or more elements of a feature set. Examples of feature sets used include orthogonal basis transforms, multiresolution transforms, mathematical moments, affinity transforms, isomorphic transforms, and multidimensional histograms.

Classification 1140 assigns the extracted implicit data into a classification maintained by the system. For instance, the set of alphabets and numerals may be used as a classification ontology for textual information.

Classification and feature extraction may be implemented using a mathematical model such as linear algebraic equations, multivariate polynomials, Bayesian networks, neural networks, fuzzy logic, genetic algorithms and simulated annealing or as a knowledge base driven rule based system or as a combination of both. In addition, these engines may include a learning mode in which the mathematical model and the knowledge base used for the feature extraction and classification is built and refined under expert machine or human guidance using the multimodal input information. The learning mode may also be used to calibrate the mathematical model and knowledge base for various intrinsic characteristics of the multimodal input information such as noise, lighting conditions, etc. The mathematical models and rule based systems may also incorporate a feedback loop such that the process learns from its output.

Each quantum of implicit data extracted may be associated with a confidence measure on the accuracy of the recognition. In addition, a one-to-one correspondence might not exist between the multimodal input information and the extracted implicit data. Each quantum of multimodal input information may be associated with a plurality of implicit data. In some scenarios, the extraction of implicit data may yield only partial results due to deficiencies in the input primary data or the process of generation of the implicit data. In such scenarios, the system continues processing using the available implicit data and the partial information.

Figure 2:
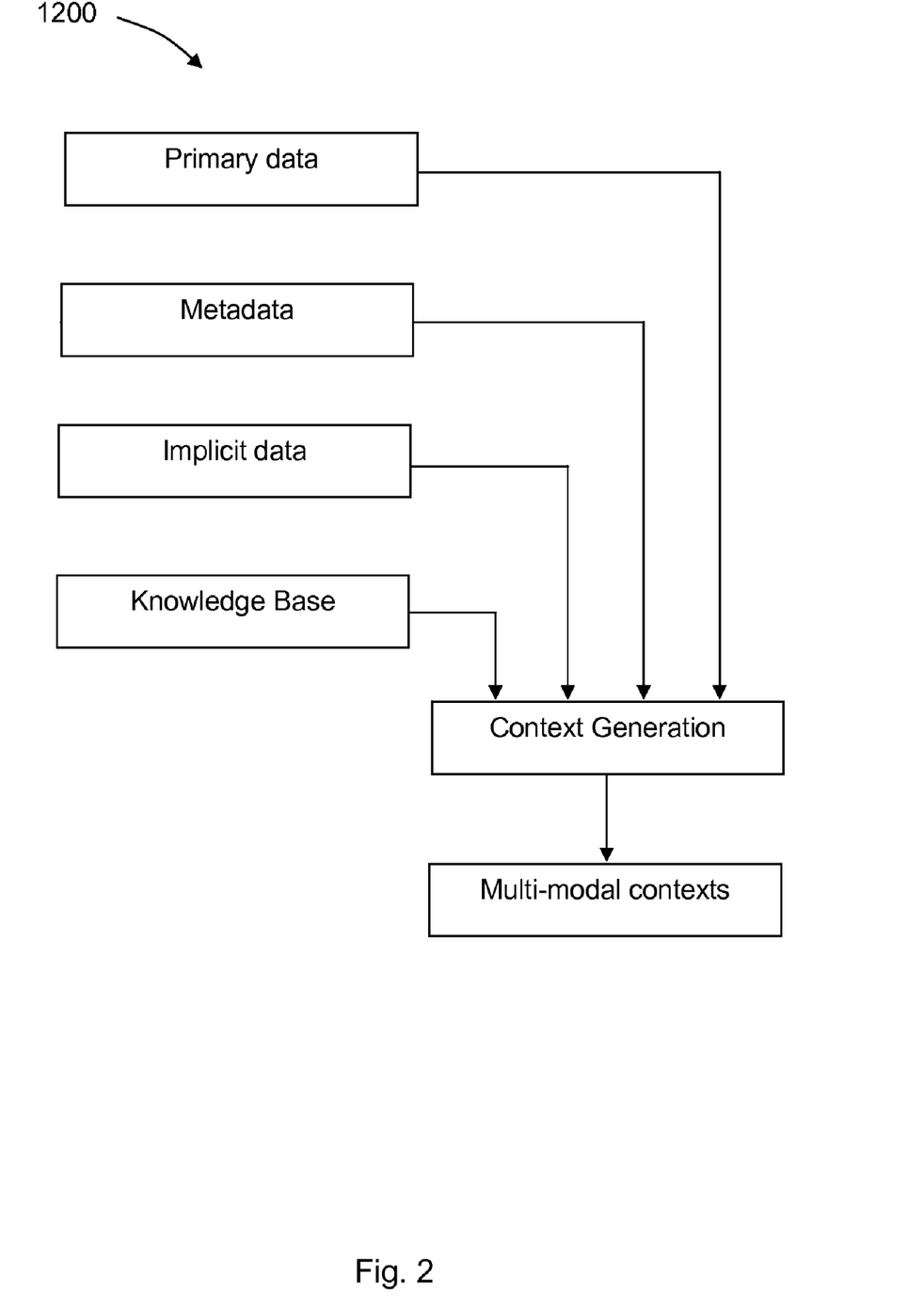
FIG. 2 illustrates an exemplary process for generating multimodal contexts, in accordance with an embodiment.

Multimodal contexts are generated using primary data, metadata, and implicit data. A process to generate multimodal contexts 1200 is illustrated in FIG. 2. In one embodiment, the process of generating contexts from multimodal input information begins with the extraction of the implicit data from the multimodal input information to constitute the complete collection of multimodal information available to form contexts i.e., primary data, implicit data and metadata. This step is followed by the generation of contexts which are defined as nonempty sets of available multimodal information.

In the scope of this description, the term "context constituents" is used to refer to the elements of the multimodal information i.e., primary data, metadata and the implicit data. Thus, a plurality of contexts comprised of one or more of the context constituents may be generated from the available set of context constituents. Each context constituent may have one or more qualitative and quantitative metrics associated with them that are used in various methods described.

In some embodiments, domain specific knowledge bases are used as part of the primary data. This enables the use of domain specific knowledge generated to extend the set of context constituents derived from the multimodal information input with equivalent context constituents.

In some embodiments, the contexts may be generated in a hierarchical manner beginning with contexts containing single elements of the context constituents. Contexts in higher levels of the hierarchy may be generated using contexts below them in the hierarchy. The context constituent used may be interpreted in association with appropriate knowledgebases available to the system for further refinement.

While the above context generation process describes a hierarchical scheme, it should be obvious to anyone skilled in the discipline to realize such contexts using other processes. Such other processes are considered to be within the spirit of this invention.

The contexts generated by the system during both the information service retrieval process and the context synthesis process, and the associated context constituents may be stored in a usage history knowledgebase to enhance various methods of the system.

Information services may be stored in databases both internal and external to the system. The information service database internal to the system is termed as the internal content database. All other information service databases are termed as external content databases. In some embodiments, certain components of information services may be in an external database. When information services or components of information services are external to the system, information services relevant to contexts may be obtained from external databases upon request of relevant information services by a user at the moment of the request. In some embodiments, content from external databases may be prefetched and cached by the system.

Figure 3:
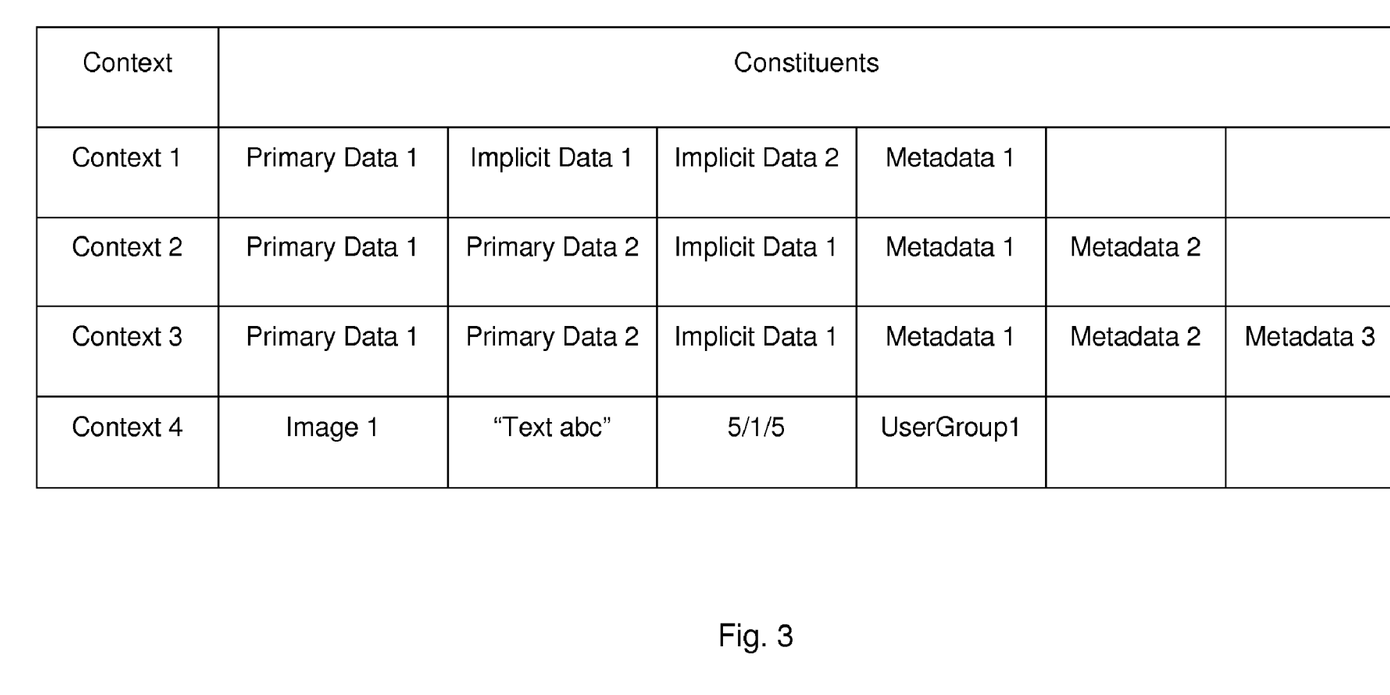
FIG. 3 illustrates an exemplary context definition table structure, in accordance with an embodiment.

The multimodal context generation mechanism described earlier, may be used as the basis for providing information services. In some embodiments, multimodal contexts are stored in a contexts database. FIG. 3 illustrates an example of a context database table. Such stored contexts may be generated by the system from a plurality of multimodal inputs using a context generation process. Optionally, the multimodal inputs themselves may also be stored as an information service in association with the generated contexts in a content database.

In some embodiments, the stored contexts may be manually entered into the system, by the users or operators of the embodiments. Such inputs may be entered using a web browser based user interface, a handheld device such as a mobile phone or a personal computer.

In some embodiments, stored contexts may be generated automatically by the system from various context sources both internal and external to the system. For instance, information from the web obtained using a web crawler, a XML/SGML feed or a RSS feed may be used to generate contexts. In some embodiments, the system may be fed electronic documents such as a PDF file which are then analyzed by the system for extracting context constituents and used to generate contexts.

In some embodiments, the system may also optionally store all inputs used for context generation. This helps to grow the context database. This historical data may be accessible to the users and operators of the system. Such data may also be used in the identification of information services relevant to contexts.

Figure 4:
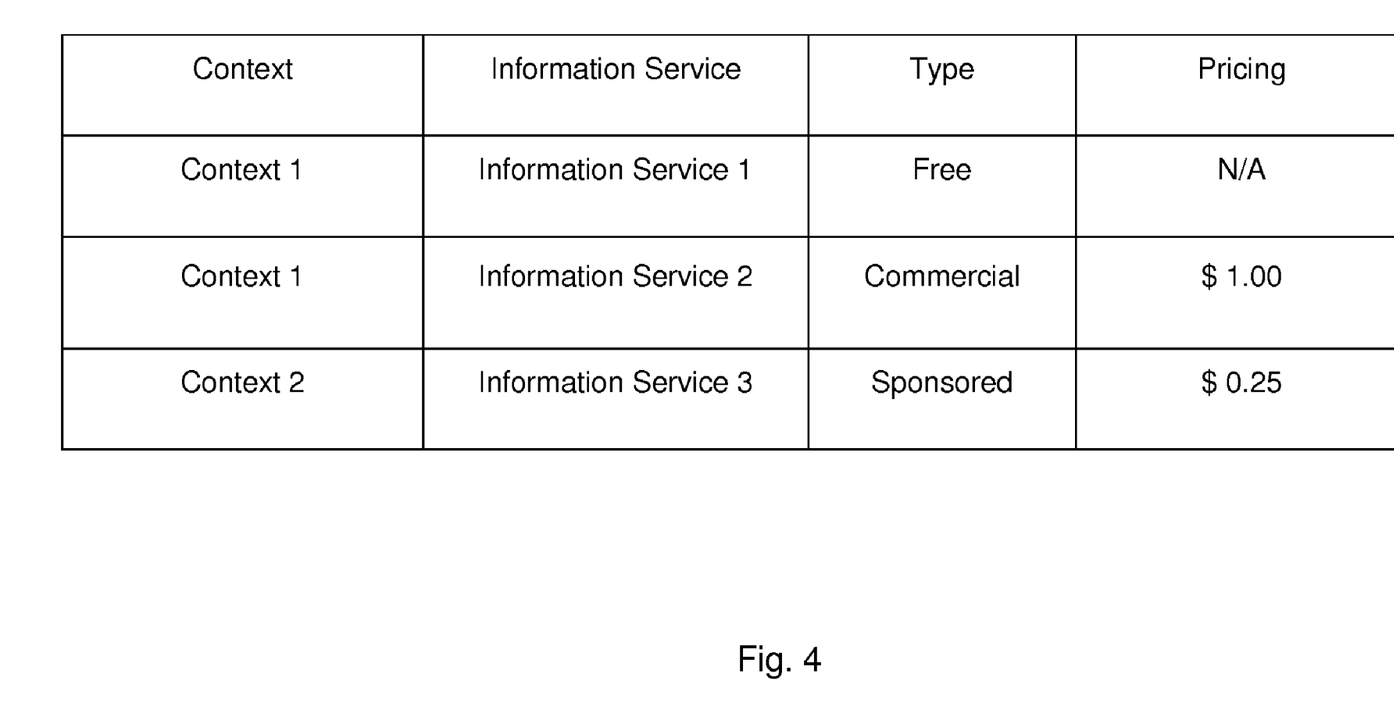
FIG. 4 illustrates an exemplary context-information service mapping table structure, in accordance with an embodiment.

A synthesis process is used to add new context-information service mappings to the system. Context-information service mapping may be performed, in run time, at the time of a multimodal query. In some embodiments, where an internal context database is maintained, context-information service mappings may be performed off-line, i.e., not in run time, for the stored contexts in the context database. FIG. 4 illustrates an example table used in off-line context-information service mapping. The mapped information services may themselves be internal or external to the system.

In some embodiments, an information service is mapped to a context manually by users or operators of the embodiment. In some embodiments, such association may be performed on a website integrated into the system. In some embodiments, a user may use a tool integrated into a web browser to associate content from any website with contexts as an information service.

In some embodiments, a user may map an information service to a context using the client user interface integrated into a portable device. In that case, the user may use the client to create a new information service and to map the newly created information service to a given context. In some embodiments, the system may automatically parse information services using techniques such as web crawler, data mining, RSS reader, etc., from several sources internal and external to the system and map them to the stored contexts in the context database. The system may also optionally associate information services with contexts automatically based on certain predefined criteria such as time of day, financial value, etc.

Figure 5:
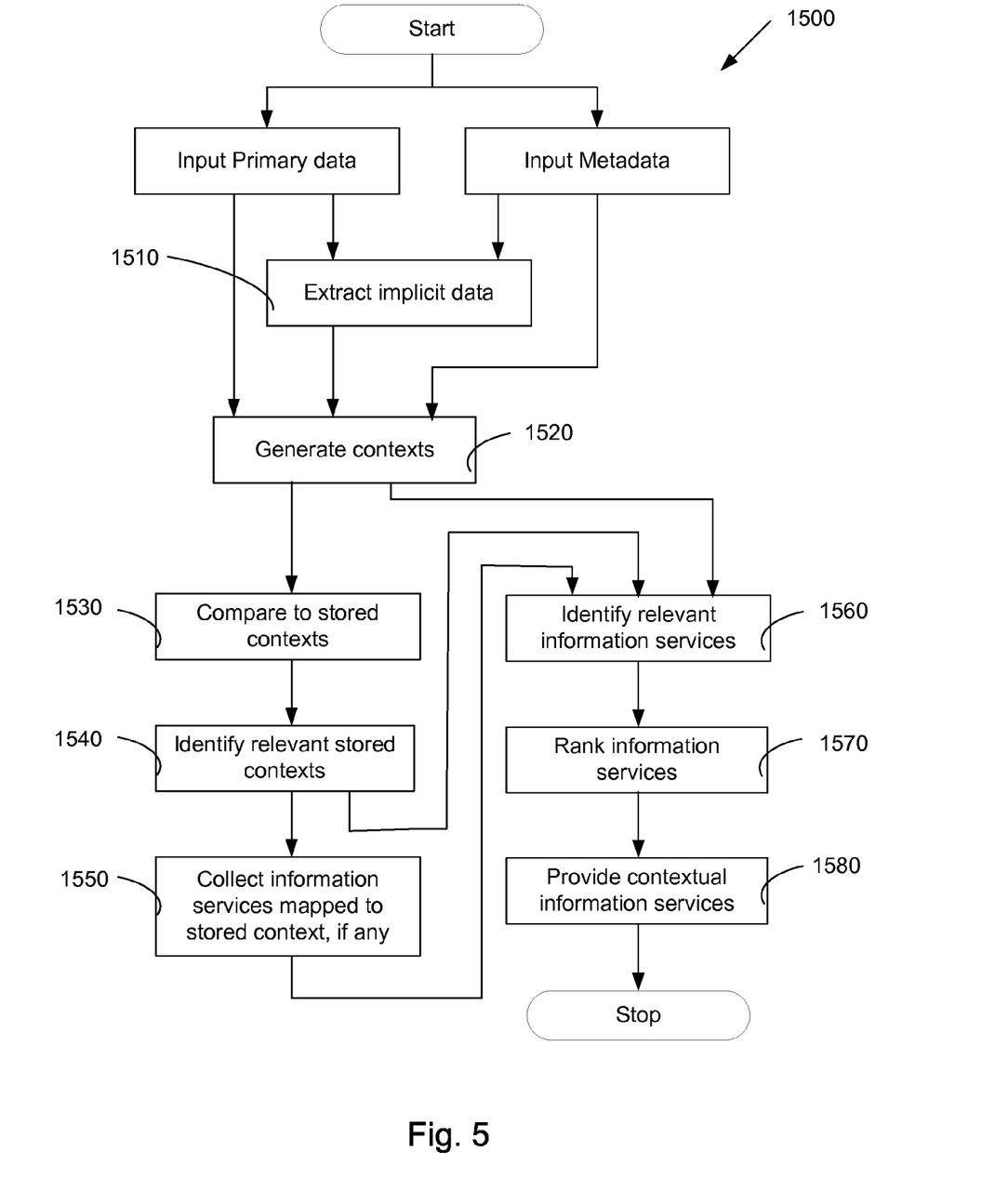
FIG. 5 illustrates an exemplary process for providing information services based on a multimodal input query, in accordance with an embodiment.

An exemplary process 1500 for retrieving information services using multimodal contexts is illustrated in FIG. 5. The generation process begins with the analysis of the primary data and metadata by the system using a set of recognition engines to extract implicit data 1510. For instance, a text recognition engine may be used to extract implicit data such as text embedded in the image along with the associated formatting information such as the font used, size of the font text, color of the text font, background color and the layout of the textual information. Following the generation of implicit data, a context generation process is used to generate contexts using the available context constituents 1520.

The generated contexts are then ranked using a context ranking process. A shortlist of the ranked contexts is used to query the various databases for information services. There are at least two different methods by which information services related to a context are identified. In one method, the ranked contexts are compared against the contexts stored in the contexts database 1530. The stored contexts that are related to the query contexts are identified 1540. The stored contexts that partially match the query contexts may also be considered to be related with an appropriate relevance measure. The process of identifying related contexts may rely on the matching of the various context constituents in the query contexts against the context constituents in the stored contexts. For instance, a query context comprised of textual implicit data "California" and the time metadata "2006" may match stored contexts containing the context constituents "California," "USA," "2006," "now," and the like in primary data, metadata or implicit data. The identified stored contexts are then used to query information service databases internal and external to the system. In some embodiments, if information services are mapped to the identified stored contexts they are included in the result as well 1550. The process of identifying information services related to a context may rely on the matching of context constituents with information embedded in information services and metadata associated with the information services. For instance, a context including a context constituent in the form of the textual string "California" and a location metadata in the form of a latitude longitude pair within the city of San Francisco may be matched with a mapping information service that provides maps of California Street in San Francisco based on the interpretation of "California" as a location related information by the system. In some embodiments, a context including a context constituent in the form of the textual string "California" may be matched with a shopping information service based on the interpretation of "California" as being part of the string "California Pizza Kitchen" by the system. In the second method, the contexts generated by the multimodal input information are directly used to query internal and external information services databases 1560. The resulting information services are ranked 1570 and provided to a user 1580.

In some embodiments, a query context or an identified stored context by itself may be presented as an information service. For instance, a context comprised of the text "Patent Application" may result in the presentation of an information service comprised of the same words "Patent Application." Although, this is a case of trivial information service generation, more complex cases work on the same principle. This may help in a scenario when only part of the available implicit data is extracted by the system due to reasons such as poor quality of the input primary data or restricted computing power.

In some embodiments, secondary contexts are generated from information services identified as relevant to a first set of contexts. Information services relevant to the secondary contexts are then presented as a result. For example, a primary context comprising of the words "Patent Application" may be used to generate an information service in the form of the USPTO web site. A set of secondary contexts is then generated using the USPTO web site and is used to generate and present a set of information services to the user. The process of deriving contexts from information services related to a given context may be also be iterated repeatedly for the generation of the information services.

In some embodiments, the system also maintains a usage history of various contexts and information services in the system. This data may be used by users, operators of the system, providers of information services and providers of context constituents. Further, information services may also rely on this usage information in aggregated (i.e., with user anonymity) form or in user identifiable form to provide appropriate functionality. For instance, an information service might automatically provide the most popular music tracks provided through the system. Such statistics may also be available through a website for analysis purposes.

An information service ranking process 1570 ranks information services retrieved from an information service database by a multimodal query based on a measure of the relevance of the retrieved information service to the query. Suitable distance measures for the context constituents generated from the query and the information services are used to compute an aggregate relevance measure. This enables the system to prioritize the presentation of the retrieved information services to the user based on its relevance to the query.

Various embodiments use mathematical, rule based models or a combination of them in algorithms, methods and processes described in this description for decision making on problems involving multiple inputs.

The mathematical models generate a quantitative representation from a plurality of inputs using appropriate weighted computation. In some embodiments the computation may be implemented as linear algebraic equations. In some embodiments, the computation may be implemented using appropriate nonlinear techniques such as multivariate polynomials, neural networks, fuzzy logic, genetic algorithms, and simulated annealing. In addition, the mathematical models may include a learning mechanism through feedback of the computation results to the input. The learning is performed through adjustments to the weights or coefficients used in various stages of computation of the mathematical model. The learning may be performed in real time or nonreal time and may be supervised or unsupervised.

The rule-based models are used where a heuristics based approach offers a better solution to the problem. In a rule-based model, the inputs are used to traverse a decision tree built from a knowledge base of rules to obtain the output. Rule-based models may also incorporate learning mechanisms in which case the model learns through incorporation of new rules into the decision tree. These rules may be generated through feedback from the output of the system or through analysis of the characteristics of the input data.

Figure 6:
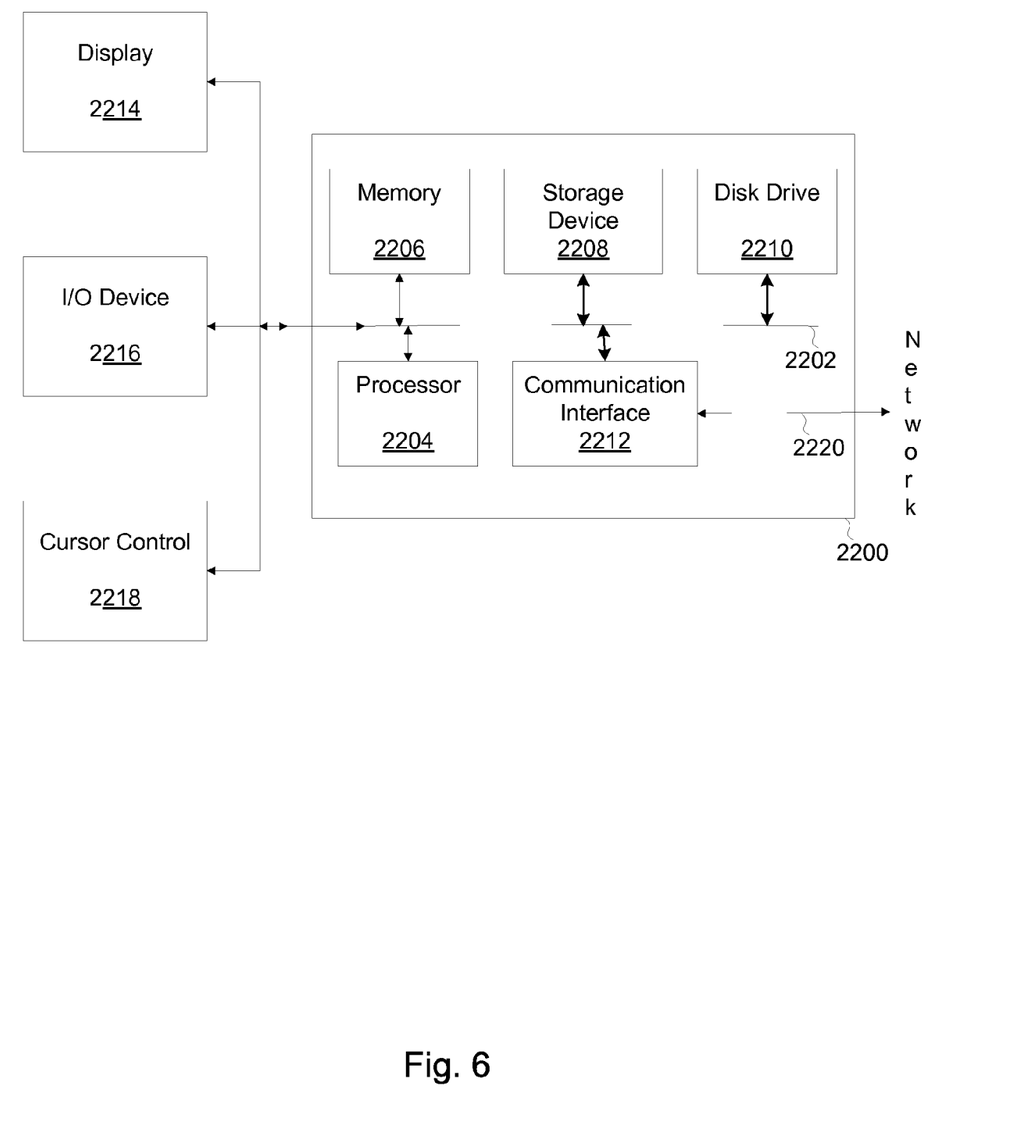
FIG. 6 is a block diagram illustrating an exemplary computer system suitable for providing information services related to multimodal inputs, in accordance with an embodiment.

FIG. 6 is a block diagram illustrating an exemplary computer system suitable for inferring knowledge from a visual imagery and providing information services relevant to visual imagery. In some embodiments, computer system 2200 may be used to implement computer programs, applications, methods, or other software to perform the above-described techniques for generating multimodal contexts and providing information services relevant to the contexts such as those described above.

Computer system 2200 includes a bus 2202 or other communication mechanism for communicating information, which interconnects subsystems and devices, such as processor 2204, system memory 2206 (e.g., RAM), storage device 2208 (e.g., ROM), disk drive 2210 (e.g., magnetic or optical), communication interface 2212 (e.g., modem or Ethernet card), display 2214 (e.g., CRT or LCD), input device 2216 (e.g., keyboard), and cursor control 2218 (e.g., mouse or trackball).

According to some embodiments, computer system 2200 performs specific operations by processor 2204 executing one or more sequences of one or more instructions stored in system memory 2206. Such instructions may be read into system memory 2206 from another computer readable medium, such as static storage device 2208 or disk drive 2210. In some embodiments, hard-wired circuitry may be used in place of or in combination with software instructions to implement the system.

The term "computer readable medium" refers to any medium that participates in providing instructions to processor 2204 for execution. Such a medium may take many forms, including but not limited to, nonvolatile media, volatile media, and transmission media. Nonvolatile media includes, for example, optical or magnetic disks, such as disk drive 2210. Volatile media includes dynamic memory, such as system memory 2206. Transmission media includes coaxial cables, copper wire, and fiber optics, including wires that comprise bus 2202. Transmission media may also take the form of acoustic or light waves, such as those generated during radio wave and infrared data communications.

Common forms of computer readable media includes, for example, floppy disk, flexible disk, hard disk, magnetic tape, any other magnetic medium, CD-ROM, any other optical medium, punch cards, paper tape, any other physical medium with patterns of holes, RAM, PROM, EPROM, FLASH-EPROM, any other memory chip or cartridge, carrier wave, or any other medium from which a computer may read.

In some embodiments, execution of the sequences of instructions to practice the system is performed by a single computer system 2200. According to some embodiments, two or more computer systems 2200 coupled by communication link 2220 (e.g., LAN, PSTN, or wireless network) may perform the sequence of instructions to practice the system in coordination with one another. Computer system 2200 may transmit and receive messages, data, and instructions, including program, i.e., application code, through communication link 2220 and communication interface 2212. Received program code may be executed by processor 2204 as it is received, and/or stored in disk drive 2210, or other nonvolatile storage for later execution.

This description of the invention has been presented for the purposes of illustration and description. It is not intended to be exhaustive or to limit the invention to the precise form described, and many modifications and variations are possible in light of the teaching above. The embodiments were chosen and described in order to best explain the principles of the invention and its practical applications. This description will enable others skilled in the art to best utilize and practice the invention in various embodiments and with various modifications as are suited to a particular use. The scope of the invention is defined by the following claims.

The invention claimed is:

1. A method comprising:
    receiving at a system server a first input comprising visual information from a client device, wherein the visual information comprises a plurality of character sequence groups;
    receiving at the system server a second input comprising audio information from the client device, wherein the audio information comprises vocals;
    extracting the plurality of character sequence groups from the visual information using an optical character recognition engine;
    converting the vocals to text using a speech recognition engine;
    generating a plurality of contexts wherein a first context comprises a first character sequence group from the plurality of character sequence groups and a first portion of the text
    identifying a first context from the plurality of contexts based on the first input;
    identifying a second context from the plurality of contexts based on the second input;
    querying a database using the first and second contexts to generate a first list comprising at least one information service;
    identifying a third context based on the first list of at least one information service;
    querying the database using the third context to generate a second list of information services;
    displaying the second list of information services on a screen of the client device;
    mapping the third context to a first information service in the list of information services, wherein the mapping the third context further comprises using rules stored at the system server;
    identifying the first information service as a first type or a second type;
    if a user accesses the first information service identified as a first type, debiting an account of the user; and
    if the user accesses the first information service identified as a second type, debiting an account of a provider of the information service.

2. The method of claim 1 wherein the first input and the second inputs are received at the system server concurrently.

3. The method of claim 1 wherein the visual information and the audio information is captured by the client device and the client device is a wireless camera phone.

4. The method of claim 3 wherein the first input and second input is received at the system server concurrently.

5. The method of claim 1 wherein the visual information is captured by the client device and the client device is a wireless camera phone.

6. The method of claim 1 wherein the first input comprises a still image captured by the client device.

7. The method of claim 1 comprising:
    storing at the system server context information comprising a plurality of context constituents, wherein the identifying a first context based on the first input comprises associating a first context constituent to the first context; and the identifying a second context based on the second input comprises associating a second context constituent to the second context.

8. The method of claim 1 wherein the audio information comprises music.

9. The method of claim 1 wherein the querying a database using the first and second context comprises identifying the at least one information service associated with the first and second context.

10. The method of claim 1 wherein the first input further comprises a temperature measurement provided by the client device.

11. The method of claim 10 wherein the querying the database comprises using the temperature measurement to generate the list of search results.

12. The method of claim 1 wherein the client device captures a multimedia stream comprising the visual and audio information.

13. The method of claim 1 wherein the receiving at the system server the first and second input, further comprises receiving the first and second input via a wireless link.

14. The method of claim 1 further comprising:
    storing the first and second input in the database;
    retrieving the first and second input in response to a query from the user;
    displaying the visual information on the screen of the client device; and
    playing the audio information through a speaker of the client device.

15. The method of claim 7 comprising:
    providing a user interface for a user to enter into a text box of the user interface each context constituent thereby populating a context database; and
    displaying the user interface in a web browser.

16. The method of claim 1 wherein the identifying a first context further comprises:
    extracting at least one character sequence group from the visual information;
    comparing at least one character sequence group to a plurality of context constituents,
    wherein the plurality of context constituents are associated with the first context; and
    if the at least one character sequence group matches a context constituent in the plurality of context constituents, recording usage history of the first context.

17. The method of claim 1 wherein after the user selects an information service from the displayed list of information services, recording usage history of the selected information service.

18. The method of claim 1 wherein the identifying a first context is based on a set of rules.

19. The method of claim 1 wherein the visual information comprises implicit data and the identifying a first context extracting implicit data associated with visual information.

20. The method of claim 1 further comprising:
    receiving at the system server metadata associated with visual information.

* * * * *